US010314316B2

(12) United States Patent
Pearce et al.

(10) Patent No.: US 10,314,316 B2
(45) Date of Patent: Jun. 11, 2019

(54) WHEAT-BASED PRODUCTS IN FOODS FOR THE WHEAT INTOLERANT

(71) Applicant: SHOALHAVEN STARCHES PTY LTD, Bomaderry (AU)

(72) Inventors: Robert John Pearce, Kiama (AU); Amy Lee Barrie, South Nowra (AU)

(73) Assignee: SHOALHAVEN STARCHES PTY LTD, Bomaderry (AU)

( * ) Notice: Subject to any disclaimer, the term of this patent is extended or adjusted under 35 U.S.C. 154(b) by 291 days.

(21) Appl. No.: 15/108,530

(22) PCT Filed: Dec. 23, 2014

(86) PCT No.: PCT/AU2014/001160
§ 371 (c)(1),
(2) Date: Jun. 27, 2016

(87) PCT Pub. No.: WO2015/117182
PCT Pub. Date: Aug. 13, 2015

(65) Prior Publication Data
US 2016/0330980 A1    Nov. 17, 2016

(30) Foreign Application Priority Data

Feb. 7, 2014   (AU) ................................ 2014900371
Mar. 12, 2014  (AU) ................................ 2014900836

(51) Int. Cl.
| A21D 2/18 | (2006.01) |
| A21D 13/066 | (2017.01) |
| A21D 2/26 | (2006.01) |
| A21D 2/36 | (2006.01) |
| A21D 10/00 | (2006.01) |

(52) U.S. Cl.
CPC .......... *A21D 13/066* (2013.01); *A21D 2/186* (2013.01); *A21D 2/265* (2013.01); *A21D 2/36* (2013.01); *A21D 10/005* (2013.01)

(58) Field of Classification Search
None
See application file for complete search history.

(56) References Cited

U.S. PATENT DOCUMENTS

| 4,412,667 A | 11/1983 | Cicuttini |
| 4,801,883 A | 1/1989 | Muller et al. |
| 8,372,466 B2 | 2/2013 | Mingus et al. |
| 2005/0129823 A1 | 6/2005 | Dohl et al. |
| 2006/0008568 A1 | 1/2006 | Elmusa et al. |
| 2009/0252844 A1 | 10/2009 | Skinner |
| 2012/0196013 A1 | 8/2012 | Haynes et al. |
| 2016/0120192 A1* | 5/2016 | Duncanson .............. A23L 33/00 426/2 |

FOREIGN PATENT DOCUMENTS

| WO | WO 2005/046347 A2 | 5/2005 |
| WO | WO 2006/017212 A1 | 2/2006 |
| WO | 2014179843 A1 | 11/2014 |

OTHER PUBLICATIONS

Barrett: Fermentable oligosaccharides, disaccharides, monosaccharides and polyols (FODMAPs) and nonallergic food intolerance: FODMAPs or food chemicals?; Therap Adv Gastroenterol. Jul. 2012; 5(4): 261-268. (Year: 2012).*
GESA: Information About Low FODMAP Diet; Copyright Jun. 2013 (Year: 2013).*
Nataliya: FODMAP Friendly and Gluten Free Plain Flour Blend; Posted on Jan. 8, 2014 at: https://notfromapacketmix.com/2014/01/08/fructose-fodmap-friendly-gluten-free-flour-blend/ (Year: 2014).*
Stanford Hospital and Clinics The Low FODMAP Diet (FODMAP= Fermentable Oligo-Di-Monosaccharides and Polyols); Digestive Health Center Nutrition Services; published Aug. 2012 (Year: 2012).*
Catsos: Sourdough Bread and FODMAPS; published Aug. 2015 (Year: 2015).*
Platts: Delicious Low Fodmaps Bread; online at least by Feb. 4, 2011 (see comments), at Genius Kitchen: https://www.geniuskitchen.com/recipe/delicious-low-fodmaps-bread-448196 (Year: 2011).*
Gibson et al., "Personal view: food for thought—western lifestyle and susceptibility to Chron's disease." The FODMAP hypothesis. Alimentary Pharmacology and Therapeutics 2005. vol. 21, pp. 1399-1409.
International Search Report and Written Opinion prepared by the Australian Patent Office dated Jan. 14, 2015, for International Application No. PCT/AU2014/001160.
Supplementary European Search Report dated Jun. 27, 2017 in European Application No. 14881592.1.
Charalampopoulos, et al., "Application of cereals and ceral components in functional foods: a review", International Journal of Food Microbiology, Apr. 25, 2002, pp. 131-141, vol. 79, Elsevier Science B.V.
Oszvald, et al., "Comparative Study of the Effect of Incorporated Individual Wheat Storage Proteins on Mixing Properties of Rice and Wheat Doughs", Journal of Agricultural and Food Chemistry, Aug. 4, 2011, pp. 9664-9672, vol. 59, ACS Publications, American Chemical Society.
Eswaran, et al., "What Role Does Wheat Play in the Symptoms of Irritable Bowel Syndrome?", Gastroenterology & Hepatology, Feb. 2013, pp. 85-91, vol. 9, Issue 2.
Diana—/user/234075, "Delicious Low Fodmaps Bread", recipe retrieved from website: http://www.food.com/recipeprint.do?rid=448196, retrieved Nov. 15, 2016, pp. 1-6.

(Continued)

*Primary Examiner* — Patricia A George
(74) *Attorney, Agent, or Firm* — Berg Hill Greenleaf Ruscitti, LLP.

(57) ABSTRACT

A reconstituted reduced FODMAPS wheat gluten protein-based flour is disclosed for use in producing a food product suitable for consumption by a wheat intolerant consumer without development of associated defining symptoms of wheat intolerance The reduced FODMAPS wheat gluten protein-based flour includes as a constituent a proportion of wheat gluten protein recovered from a source wheat flour and additional constituents of types which have been recovered from wheat flour or other non-wheat source and which have been substantially depleted of FODMAPS content.

12 Claims, No Drawings

(56) References Cited

OTHER PUBLICATIONS

Barrett, et al., "Dietary poorly absorbed, short-chain carbohydrates increase delivery of water and fermentable substrates to the proximal colon", Alimentary Pharmacology & Therapeutics, Jan. 22, 2010, pp. 874-882, vol. 31, Blackwell Publishing Ltd.

Biesiekierski, et al., "Gluten Causes Gastrointestinal Symptoms in Subjects Without Celiac Disease: A Double-Blind Randomized Placebo-Controlled Trial", The American Journal of Gastroenterology, Jan. 11, 2011, pp. 505-514, vol. 106, The American College of Gastroenterology.

Biesiekierski, et al., "No Effects of Gluten in Patients With Self-Reported Non-Celiac Gluten Sensitivity After Dietary Reduction of Fermentable, Poorly Absorbed, Short-Chain Carbohydrates", Gastroenterology, 2013, pp. 320-328, vol. 145, AGA Institute.

Biesiekierski, et al., "Quantification of fructans, galacto-oligosacharides and other short-chain carbohydrates in processed grains and cereals", Journal of Human Nutrition and Dietetics, 2011, pp. 154-176, vol. 24, The British Dietetic Association Ltd.

Catassi, et al., "Non-Celiac Gluten Sensitivity: The New Frontier of Gluten Related Disorders", Nutrients, Sep. 26, 2013, pp. 3839-3853; vol. 5.

Gibson, et al., "Personal view: food for thought—western lifestyle and susceptibility to Crohn's disease. The FODMAP hypothesis", Aliment Pharmacol Ther; Apr. 1, 2005, pp. 1399-1409, 2005 Blackwell Publishing Ltd.

Gibson, et al., "Evidence-based dietary management of functional gastrointestinal symptoms: The FODMAP approach", Journal of Gastroenterology and Hepatology, 2010, pp. 252-258, Journal of Gastroenterology and Hepatology Foundation and Blackwell Publishing Asia Pty Ltd.

Halmos, et al., "A Diet Low in FODMAPs Reduces Symptoms of Irritable Bowel Syndrome", Gastroenterology, 2014, pp. 67-75, vol. 146, AGA Institute.

Knudsen, "Carbohydrate and lignin contents of plant materials used in animal feeding", Animal Feed Science Technology, 1997, pp. 319-338, vol. 67, Elsevier Science B.V.

Lopez et al., "Flour Mixture of Rice Flour, Corn and Cassava Starch in the Production of Gluten-Free White Bread", Brazilian Archives of Biology and Technology, Mar. 2004, pp. 63-70, vol. 47, No. 1, Printed in Brazil.

Ong, et al., "Manipulation of dietary short chain carbohydrates alters the pattern of gas production and genesis of symptoms in irritable bowel syndrome", Journal of Gastroenterology and Hepatology, Apr. 26, 2010, pp. 1366-1373, vol. 25, Journal of Gastroenterology and Hepatology Foundation and Blackwell Publishing Asia Pty Ltd.

Shepherd, et al., "Dietary Triggers of Abdominal Symptoms in Patients With Irritable Bowel Syndrome: Randomized Placebo-Controlled Evidence", Clinical Gastroenterology and Hepatology, 2880, pp. 765-771, vol. 6, No. 7, AGA Institute.

Whelan, et al., "Fructan content of commonly consumed wheat, rye and gluten-free breads", International Journal of Food Sciences and Nutrition, Mar. 23, 2011, pp. 498-503, vol. 62, No. 5, Informa UK, Ltd.

\* cited by examiner

WHEAT-BASED PRODUCTS IN FOODS FOR THE WHEAT INTOLERANT

CROSS REFERENCE TO RELATED APPLICATIONS

This application is a national stage application under 35 U.S.C. 371 and claims the benefit of PCT Application No. PCT/AU2014/001160 having an international filing date of 23 Dec. 2014, which designated the United States, which PCT application claimed the benefit of Australian Patent Application No. 20144900371 filed 7 Feb. 2014, and Australian Patent Application No. 20144900836 filed 12 Mar. 2014, the disclosures of each of which are incorporated herein by reference.

FIELD OF THE INVENTION

The present invention relates to food products that are produced from materials which include wheat gluten protein derived from wheat flours that may be consumed by those affected by wheat intolerance without development of the associated defining symptoms.

BACKGROUND TO THE INVENTION

Wheat-based products especially wheat flours and derivatives from wheat flours cause adverse health conditions in a minor but significant proportion of the human population.

Wheat allergy is well documented, less severe than allergies to several other food allergens and mediated via an IgE-mediated response to wheat protein. Wheat-based products can neither be consumed or applied topically to avoid an allergic response.

Coeliac Disease has been recognised in children failing to thrive and persists through adulthood. It has been shown to be a genetically-determined autoimmune condition stimulated by the consumption of wheat protein (gluten) causing the lining of the small intestine to be eroded and lose its digestive and nutrient absorptive capacity. A gluten-free diet for persons so affected is necessary throughout life and many such gluten-free foods are now available suitable for persons with Coeliac Disease.

Less-well-defined food intolerance has been attributed to wheat-based foods amongst others. Symptoms include feelings of abdominal discomfort, bloating and flatus are often referred to as Irritable Bowel Syndrome (IBS); these have been attributed to abnormal response to fermentation of ingested foods in the distil part of the small intestine and proximal region of the large intestine of the gastrointestinal tract. Avoidance of certain foods including wheat-based products often remedies the physiological condition. Desirable foods without-wheat derived ingredients such as gluten-free breads have been formulated with flours from rice, corn (maize) and cassava as described in Lopex et al (2004) (A C B Lopez, A J G Pereira and R G Junqueira (2004) Flour mixture of Rice Flour, Corn and Cassava starch in the production of gluten-free bread. *Brazilian Arch Biol Technol* 47; 63-70.)

In 2005 Gibson and Shepherd (R. R. Gibson & S. J. Shepherd (2005) Personal view: food for thought—western lifestyle and susceptibility to Crohn's disease. The FODMAPS hypothesis. *Aliment. Pharmacol. Ther.* 21, 1399-1409.) proposed a new hypothesis by which excessive delivery of highly fermentable but poorly absorbed short-chain carbohydrates and polyols which they designated FODMAPS—Fermentable Oligosaccharides, Disaccharides, Monosaccharides And PolyolS—to the distil small intestinal lumen induced abnormal conditions in the bowel.

A diet with increasing evidence of efficacy for the management of IBS is the low FODMAPS diet described by Gibson & Shepherd (2010) (Gibson, P. R and Shepherd, S. J. (2010) Evidence-based dietary management of functional gastrointestinal symptoms: the FODMAPS approach. *J Gastroenterol Hepatol.* 25: 252-258). In healthy individuals such fermentation may indeed be advantageous to gut health but to those with IBS, fermentation of FODMAPS should be avoided to the greatest extent possible by careful diet selection; the quantity present may vary greatly between different food sources. The list of foods with a high content of FODMAPS includes wheat flour and products made with it, which has led to popular recognition of a health condition referred to as wheat intolerance or more specifically Non-Coeliac Gluten Sensitivity (NCGS).

Biesiekierski et al (2011) (Biesiekierski, J. R., Newnham, E. D., Irving, P. M., Barrett, J. S., Haines, M., Doecke, J. D., Shepherd, S. J., Muir, J. G. and Gibson, P. R. (2011) Gluten causes gastrointestinal symptoms in subjects without celiac disease: a double blind randomised placebo-controlled trial *Am. J. Gastroenterol* 106, 508-514) reported that after many dietary tests that some non-coeliacs experienced pain and bloating after eating foods containing gluten and concluded that Non-Coeliac Gluten Intolerance (Sensitivity) may exist. This prompted a proliferation in gluten-free foods in the marketplace.

According to a recent multi-authored review by Carlo Catassi et al available as an open access article www.ncbi.nlm.nih.gov/pmc/articles/PMC3820047, Non Coeliac Gluten Sensitivity: The New Frontier of Gluten Related Disorders, the frequency of NCGS is still unclear and an overlap between NCGS and IBS has been detected. Lack of biomarkers is still a major limitation of clinical studies making it difficult to differentiate NCGS from other gluten related disorders.

However, in a complete reversal of their conclusions in Biersiekierski et al (2011), more recently Biesiekierski et al (2013) (Biesiekierski, J R, Peters, S. L., Newnham, E. D., Rosella, O, Muir, J. G. and Gibson P. R. (2013) *Gastroenterology* 145(2) 320-328) showed no effects of gluten intolerance in patients with self-reported non-celiac gluten sensitivity after dietary reduction of fermentable, poorly absorbed, short-chain carbohydrates. In a placebo-controlled, cross-over rechallenge study, they found no evidence of specific or dose-dependent effects of gluten in patients with NCGS placed on diets low in FODMAPS.

Understanding of FODMAPS encompasses mechanisms of action, being luminal distension from their osmotic effect as described by Barrett et al (2010) (Barrett, J. S, Gearry, R. B, Muir, J. G, Irving, P. M, Rose, R, Rosella, O, Haines, M. L, Shepherd, S. J, and Gibson, P. R. (2010) Dietary poorly absorbed, short-chain carbohydrates increase delivery of water and fermentable substrates to the proximal colon. *Aliment Pharmacol Ther* 31:874-882) together with rapid fermentation preferentially to hydrogen as described by Ong et al (2010) (Ong, D. K, Mitchell, S. B, Barrett, J. S, Shepherd, S. J, Irving, P. M, Biesiekierski, J. R, Smith, S, Gibson, P. R. and Muir, J. G. (2010) Manipulation of dietary short chain carbohydrates alters the pattern of gas production and genesis of symptoms in irritable bowel syndrome *L Gastroenerol Hepatol.* 25:1366-1373).

These findings together with support of continually expanding food compositional analysis, have led to widespread application of the low-FODMAPS diet to manage IBS symptoms throughout Australia and New Zealand and in some parts of Europe and North America. In a controlled, cross-over study of patients with IBS by Halmos et al (2014) (Emma P. Halmos, Victoria A. Power, Susan J Shepherd, Peter R Gibson and Jane G. Muir (2014) A diet low in FODMAPS reduces symptoms of Irritable Bowel Syndrome. *Gastroenterol* 146: 67-75), demonstrated that a diet low in FODMAPS effectively reduced functional gastrointestinal symptoms.

Consequently, we have recognised a significant opportunity that could provide benefit commercially and socially. It is estimated that approximately 14% of western consumers used to eating bread and other wheat-based products exhibit or develop wheat intolerance. By the present invention, food products containing wheat gluten protein are made tolerable for those normally wheat intolerant by provision of ingredients that meet medically established criteria for low-FODMAPS content.

Understanding of what low-FODMAPS in a food means analytically appears not to be precise and may relate to individual response to dietary FODMAPS intake. Shepherd et al (2008) (Shepherd S. J., Parker, F C, Muir J G and Gibson P R Dietary triggers of abdominal symptoms in patients with Irritable Bowel Syndrome; randomised placebo-controlled evidence. *Clin Gastroenterol. Hepatol* 6, 765-711) established baseline (low-FODMAPS) diets with daily quantities of fructans (FODMAPS) in the range 1.1-2.7 g.

Gibson & Shepherd (2010) (Gibson, P R and Shepherd S J (2010) Evidence-based dietary management of functional gastrointestinal symptoms: the FODMAP approach. *J Gastroenterol Hepatol.* 25, 252-268) considered >0.2 g of fructans (FODMAPS) per serve at risk of inducing symptoms.

Halmos et al (2014) (Halmos E P, Power, V A, Shepherd S J, Gibson P R & Muir J G A diet low in FODMAPS reduces symptoms of Irritable Bowel Syndrome *Gastroenterol* 146, 67-75) described low FODMAP as <0.5 g FODMAPS per sitting and in the Mean Daily Nutrition Information tabulated therein for the Low FODMAP diet the Total FODMAPS were reported as 3.05 (1.86-4.25) g.

Monash University Department of Gastroenterology and Translational Nutrition have set a level of less than or equal to 0.3 g FODMAPS per serve for Low-FODMAPS foods (Monash University Analytical Report 2014) however, a defining level for FODMAPS content in flours and ingredients has not been published.

The fructan content of breads varies considerably according to Whelan et al (2011), (Whelan, K, Abrahmsohn, O, David, G J, Staudacher H, Irving, P, Lower M C and Ellis, P R (2011) Fructan content of commonly consumed wheat, rye and gluten-free breads. *Int J Food Sci Nutr* 62(5), 498-503) with a range of 0.61-1.94 g fructan/100 g bread.

As aforesaid, gluten-free foods have proliferated recently in response to predominantly self-diagnosed wheat intolerance such foods being substantially formulated using flours from rice or corn (maize). Consequently low-FODMAPS WGPF should preferably have a FODMAPS content less than or equal to that of corn or rice flours to be sufficiently low so as not to result in wheat intolerance. The fructan (FODMAPS) content of maize is reported as 0.6 g/100 g by Knudsen (1997) (KEB Knudsen (1997) Carbohydrate and lignin contents of plant materials used in animal feeding. *Animal Feed Sci Technol* 67; 319-338) which is a little higher than that for rice flour (see Example 1. Table 1).

Modern methods of food technology combined with advanced food analysis enable components of food source materials to be separated or isolated and used either directly as food ingredients or nutraceuticals or combined as required to prepare special foods to meet particular dietary or health outcomes.

Processing liquid food source materials such as milk into its multiple components at high purity for nutriceutical application is greatly advanced through developments in separation technologies especially centrifugation, membrane technologies and ion exchange processes. By comparison, separation and purification of components from cereal sources such as wheat flour has been slower for dietary and health advantage due to the complexity of the composition and the physical and chemical properties of the components that render them difficult to separate from each other and purify to the extent required for nutriceutical purposes.

Wheat flour is unique amongst widely consumed cereal flours in that it contains protein which when mixed with water in a dough or batter or when extracted from the flour with abundance of water forms a complex known as wheat gluten. This wheat gluten protein (WGP) complex has unique physical and chemical properties that are demonstrated as well-documented, characteristic visco-elastic properties. These protein properties of viscous strength combined with elasticity independent of other components of flour uniquely allow a cohesive dough or batter to be formed which can be expanded by inclusion of a gas usually carbon dioxide generated by a fermentation process or a chemical reaction or can be processed into various non-expanded cohesive forms. When such doughs or batters containing wheat gluten protein in various formulations as have been prepared over thousands of years and documented in cookery and recipe books in many languages through recent history are cooked by a variety of means in a range of configurations, products arising are often deemed highly desirable as food items.

The composition of wheat flour has been modified or augmented for purposes of changing the functional performance of dough made from it or for improving the nutritional value. For such purposes wholly or partially reconstituted and recombined flours have been described but these purposes are different from the purpose of the present invention.

US Patent Application 2009252844 discloses the formation of a partially reconstituted high fibre wheat flour by dry combining a low-moisture-content fibre source into the host/carrier in an amount which provides a substantially homogeneous mixture throughout and dry blending into a homogeneous mixture one grain-based binder and a grain-based tenderiser. The use of such partially reconstituted wheat flour in pasta is disclosed. The invention provides for nutritionally improved reconstituted wheat flour with higher fibre content but does not consider the FODMAP content of the flour or teach reconstituted wheat flour for the wheat intolerant.

U.S. Pat. No. 8,372,466 discloses a recombined whole grain flour for use in preparing whole grain products such that the whole grain particulates provide minimum visual impact to the whole grain product. By selectively controlling the particle size of the milled bran and germ constituents used in the recombined whole grain flour the visual and colour impact associated with bran and germ particulates can be substantially eliminated from the whole grain product. The invention provides a process for a more visually acceptable whole grain reconstituted flour but does not consider the FODMAP content of the flour or teach reconstituted wheat flour for the wheat intolerant.

US Patent Application No 20120196013 discloses a combined stabilised bran component and stabilised whole grain wheat flour produced by subjecting a bran enriched coarse fraction which contains bran, germ and starch to grinding or milling to reduce grittiness of the coarse fraction without substantially damaging the starch due to abrasion. The invention provides a process for improving the texture of a reconstituted high fibre wheat flour but does not consider the FODMAP content of the flour or teach reconstituted wheat flour for the wheat intolerant.

The increase in incidence of obesity particularly in western populations has driven progress towards foods considered less likely to promote weight gain and obesity. Higher protein content and lower carbohydrate content in foods and in the diet have been advocated for such health benefit and inventions have been disclosed for this purpose which is different from the purpose of the present invention.

US Patent Application 20050129823 discloses the composition and method for making high-protein and low carbohydrate food products. This is achieved for advantage in baked goods and extruded food products by substituting wheat flour wholly or in part by a combination of starch that is resistant to amylase digestion and proportions of various protein-rich ingredients selected from wheat gluten, devitalised wheat gluten, deamidated wheat gluten, and hydrolysed wheat gluten. Additionally fibre-rich and other ingredients were utilised to prepare a wide range of foods demonstrated in 54 Examples. Of these, all except four contained in their formulations a proportion of wheat flour; of the four, two contained no starch, a third contained soy products and a fourth product contained a polyol. However, the invention predates the FODMAP hypothesis and is directed towards a different purpose. No consideration is given to the FODMAP content of the individual ingredients or to total FODMAPS content of food formulations exemplified or their suitability for wheat intolerant persons. FODMAPS contents would be considerable due to the contents of wheat flour or other FODMAP-containing ingredients. Consequently, food products made by the process of the invention would not be suitable for persons with wheat intolerance nor does the invention lead or direct one skilled in the art towards the product and process of the present invention.

U.S. Pat. No. 4,255,518 discloses a process of water recycling in the wet milling of cereal relating to the recovery of starch from corn, wheat, rice, milo and the like.

U.S. Pat. No. 4,412,867A discloses wet milling of starch bearing materials including corn wheat and potatoes with water recycle after reverse osmosis or ultrafiltration in order to reduce the water requirement of the milling process.

US Patent Application 2006008568 discloses a low carbohydrate bread product prepared by using a bread dough substantially free of wheat flour. A wheat starch, a wheat protein isolate and a soluble fibre are mixed into a dough and baked. The purpose of the invention was to produce a low carbohydrate content in a bread product to meet a dietary perception that less carbohydrate and more protein and fibre provided dietary advantage. The objects of this invention are thus completely different issue and addressed a different health problem than the issue addressed in the present invention. US Patent Application 2006008568 predates the FODMAP hypothesis and consequently does not consider the FODMAP content of the ingredients and the suitability of the bread product for wheat intolerant persons.

Further in US Patent Application 2006008568 the principal ingredients are (1) a commercial wheat starch product separated from a wheat flour which within commercial separation limitations according to modern manufacturing practice would be substantially washed free of gluten and (2) a commercial gluten product separated from a wheat flour which within commercial separation limitations according to modern manufacturing practice would be substantially reduced in starch content relative to the ratio of starch to gluten in the parent flour, Such starch and gluten products however have not been analysed in this disclosure for FODMAPS content and in any event could not be inherently low-FODMAPS because of the limitations of said known commercial manufacturing practices.

Gluten protein product, commercially as vital wheat gluten, is typically manufactured at 75% protein content (N %×5.7) and sometimes, after more vigorous separation processes, at 80% protein, these compositions reflecting the degree of difficulty in removing fine particles of starch and fibre from a visco-elastic gluten mass. Consequently, 20-25% of the gluten product is not protein but residual fat, starch, fibre and other components of flour entrapped within the visco-elastic mass. Because of the difficulty of separating the gluten protein from non-gluten components of flour known commercial manufacturing adopts procedures that utilise recycling of aqueous extracts within the manufacturing plant to conserve total water usage. This however would not produce sufficiently low FODMAPS products to meet the specific dietary needs of wheat intolerant persons.

Consequently there is no information in any of the above prior art documents either singly or in combination which discloses, suggests or teaches the current invention of the applicant.

SUMMARY OF THE INVENTION

It is an object of the invention to ameliorate the aforementioned disadvantages and accordingly a reconstituted low-FODMAPS wheat gluten protein-based flour (WGPF) is disclosed for use in producing a food product suitable for consumption by a wheat intolerant consumer without development of associated defining symptoms of wheat intolerance, said low-FODMAPS WGPF including as a constituent a proportion of wheat gluten protein recovered from a source wheat flour and additional constituents of types which have been recovered from wheat flour or other non-wheat source and all of which have been sufficiently depleted of FODMAPS content whereby such low-FODMAPS WGPF is defined as containing preferably less than or equal to 1200 mg FODMAPS per 100 g low-FODMAPS WGPF on a dry solids basis. More preferably the low-FODMAPS WGPF may contain less than or equal to 1000 mg FODMAPS per 100 g low-FODMAPS WGPF on a dry solids basis. Yet more preferably the low-FODMAPS WGPF may contain less than or equal to 800 mg FODMAPS per 100 g low-FODMAPS WGPF on a dry solids basis. Most preferably the low-FODMAPS WGPF may contain less than or equal to 600 mg FODMAPS per 100 g low-FODMAPS WGPF on a dry solids basis.

One element of novelty of the present invention relative to prior invention is that, by selecting WGP for its unique physical chemical and functional properties as the core functional food ingredient and manufacturing it in a manner resulting in sufficiently low FODMAPS content that when combined with other constituent types found in flour but not unique to wheat flour that have also been manufactured in ways resulting in sufficiently depleted FODMAPS content, so providing a reconstituted WGP-based flour (WGPF) that is a low-FODMAPS product the said reconstituted low-FODMAPS WGPF being tolerated by persons affected by wheat intolerance.

In furtherance of said object the invention also discloses a process of producing said reconstituted low-FODMAPS WGPF suitable for use in a food product for a wheat intolerant consumer, said process including the steps of:—
dispersing a source wheat flour in an aqueous solution at a temperature at which starch particles in said source flour are not hydrated or dissolved,
recovering a wheat gluten protein from said dispersion,
washing said wheat gluten protein whereby the FODMAPS content thereof is depleted sufficiently for use in said low-FODMAPS WGPF,
combining said wheat gluten protein with one or more insoluble suspended materials which have been recovered either from wheat flour or other non-wheat source and have been depleted of FODMAPS sufficiently for use in said low-FODMAPS WGPF.

The term "other non-wheat source" may (without limitation) include for example soy, oat, barley, pea, lentils, pulses, potato, tapioca, corn, and any other new sources that provide sufficiently low FODMAPS content for use in a low-FODMAPS WGPF which may be consumed by wheat intolerant consumers.

In still furtherance of said object the invention also discloses a food product which includes the reconstituted low-FODMAPS WGPF as referred to above.

In another aspect the present invention further relates to novel low-FODMAPS WGPF products adapted for consumption by persons affected by wheat intolerance including NCGS, said products containing WGP as the core functional food ingredient with a FODMAPS content sufficiently low for use in a low-FODMAPS WGPF and combined with other constituent types found in flour but not unique to wheat flour that also have a FODMAPS content sufficiently low for use in a low-FODMAPS WGPF whereby said low-FODMAPS WGPF products may be consumed by those affected by wheat intolerance without development of the associated defining symptoms.

Another aspect of the invention further relates to the process of producing low-FODMAPS WGPF products containing WGP as the core functional food ingredient with a FODMAPS content sufficiently low for use in a low-FODMAPS WGPF and combined with other constituent types found in flour but not unique to wheat flour that also have a FODMAPS content sufficiently low for use in a low-FODMAPS WGPF whereby said low-FODMAPS WGPF products may be consumed by those affected by wheat intolerance without development of the associated defining symptoms.

A further aspect of the invention further relates to applications in foods of low-FODMAPS WGPF products that contain WGP as the core functional food ingredient with a FODMAPS content sufficiently low for use in a low-FODMAPS WGPF and combined with other constituent types found in flour but not unique to wheat flour that also have a FODMAPS content sufficiently low for use in a low-FODMAPS WGPF whereby said low-FODMAPS WGPF products may be consumed by those affected by wheat intolerance without development of the associated defining symptoms.

By a process of the present invention low-FODMAPS WGPF materials are produced which are depleted sufficiently of FODMAPS to meet medically established criteria for low-FODMAPS content in foods as afore defined thereby when consumed not resulting in the defining symptoms of wheat intolerance.

By a process of the present invention WGP is produced that is depleted sufficiently of FODMAPS for use in a low-FODMAPS WGPF and is combined with starch and optionally other constituents of flour derived from wheat flour or other sources also depleted sufficiently of FODMAPS for use in a low-FODMAPS WGPF thereby when consumed not resulting in the defining symptoms of wheat intolerance.

By a process of the present invention a reconstituted low-FODMAPS WGPF is produced in which the constituent WGP provides unique physical chemical and functional properties and when combined with starch and optionally other constituents of flour derived from wheat flour or other sources also depleted sufficiently of FODMAPS for use in a low-FODMAPS WGPF so enables food products normally and traditionally prepared with wheat flour to be similarly prepared but sufficiently depleted of FODMAPS to meet medically established criteria for low-FODMAPS content in foods as afore defined thereby when consumed not resulting in the defining symptoms of wheat intolerance.

In accordance with the invention a process is further disclosed for producing said WGP and low-FODMAPS WGPF materials, said method preferably including the steps of:—
dispersing a wheat flour in an aqueous solution such as water at a temperature in the range of about 10 C to about 60 C whereby starch particles are not hydrated or dissolved,
from this dispersion the suspended solids are recovered and separated into well-recognised major component types by processes including settling, screening, filtration or centrifugation.
the WGP component is extensively washed with water, enriched in protein content, depleted of water soluble materials including FODMAPS sufficiently for use in low-FODMAPS WGPF to meet medically established criteria for low-FODMAPS content in foods as afore defined and collected
optionally the collected WGP is dried in the well-documented manner of wheat gluten manufacture
from the aforesaid dispersion depleted of WGP, A- B- and C-starches and fibre materials are separated, extensively washed with water, purified, collected and optionally dried in the well-documented manner of starch manufacture said starches and fibre materials being depleted of FODMAPS sufficiently for use in low-FODMAPS WGPF to meet medically established criteria for low-FODMAPS content in foods as afore defined.
the aforesaid A- B- and C-starches and fibre materials being depleted of FODMAPS sufficiently for use in low-FODMAPS WGPF to meet medically established criteria for low-FODMAPS content in foods as afore defined are used optionally in a low-FODMAPS WGPF of this invention.
the residual water-soluble materials including the FODMAPS are separated from insoluble materials and further processed preferably using membrane technology to separate and recover the soluble proteins, dextrins and soluble fibre away from the FODMAPS.

It is further preferred that by a process of the present invention wheat flour is dispersed in water at any temperature less than about 60 C so that starch particles are not hydrated and dissolved by any suitable means. From this dispersion the great majority of the suspended solids are recovered and possibly fractionated according to the well-documented manner of starch and gluten manufacture as aforesaid. The water-soluble materials including the low molecular weight FODMAPS are further processed to separate them from larger molecular species including proteins, dextrins and soluble non-starch polysaccharides. Any suitable means may be used for the separation according to the possible usage of each of the higher molecular weight components, especially preferred is the process of ultrafiltration whereby proteins, dextrins and non-starch polysaccharides are retained by a perforated membrane and smaller FODMAP species and other low molecular weight components filter with water through the perforated membrane. By the process of diafiltration, additional water may be added to the retained species to enable more of the permeable species to traverse the membrane and so further deplete the FODMAP content of the retained species sufficiently for use in low-FODMAPS WGPF to meet medically established criteria for low-FODMAPS content in foods as afore defined. The concentrated liquid product so obtained by retention of the high molecular weight components by the filter may be dried by any suitable means and utilised in the preparation of a reconstituted low-FODMAPS WGPF.

It is further preferred that by a process of the present invention WGP having FODMAPS content sufficiently depleted for use in low-FODMAPS WGPF to meet medically established criteria for low-FODMAPS content in foods as afore defined is combined with proportions of non-gluten constituents of flour from wheat or other source with FODMAPS content depleted sufficiently for use in low-FODMAPS WGPF to meet medically established criteria for low-FODMAPS content in foods as afore defined to produce a reconstituted low-FODMAPS WGPF.

It is further preferred that by a process of the present invention materials having FODMAPS content sufficiently low for use in a low-FODMAPS WGPF as afore defined are combined to produce a reconstituted low-FODMAPS WGPF product including a proportion of washed WGP with FODMAPS content sufficiently low for use in low-FODMAPS WGPF as freshly recovered and washed wet gluten or as commercial food grade Vital Wheat Gluten with the FODMAPS content depleted sufficiently for use in low-FODMAPS WGPF as afore defined the said reconstituted low-FODMAPS WGPF product having a gluten content in the range 5-20% on a dry basis, more preferably in the range 8-14% on a dry basis. Said Vital Wheat Gluten should contain protein on a N %×6.25 dry solids basis in a range of about 80-90% It is further preferred that by a process of the present invention materials including WGP having FODMAPS content depleted sufficiently for use in a low-FODMAPS WGPF as afore defined are combined to produce a reconstituted low-FODMAPS WGPF product including a proportion of washed starch with FODMAPS content sufficiently low for use in low-FODMAPS WGPF as freshly recovered and washed wet starch or as commercial dry food grade starch from wheat flour or other sources with the FODMAPS content depleted sufficiently for use in a low-FODMAPS WGPF as afore defined the said reconstituted low-FODMAPS WGPF product having a starch content in the range 50-95% on a dry basis, more preferably in the range 80-92% on a dry basis.

It is further preferred that by a process of the present invention materials including WGP having FODMAPS content depleted sufficiently for use in a low-FODMAPS WGPF as afore defined are combined to produce a reconstituted low-FODMAPS WGPF product including a proportion of washed fibre having FODMAPS content depleted sufficiently for use in a low-FODMAPS WGPF as freshly recovered and washed wet fibre or as commercial dry food grade fibre from wheat or other source having FODMAPS content depleted sufficiently for use in a low-FODMAPS WGPF the said reconstituted low-FODMAPS WGPF product having a fibre content in the range 1-10% on a dry basis.

It is further preferred that by a process of the present invention proportions of materials including WGP that are insoluble in water are combined with a proportion of materials that are soluble in water but depleted of FODMAPS sufficiently for use in a low-FODMAPS WGPF as afore defined to produce a low-FODMAPS WGPF product containing proportions of constituents from wheat flour or other source but with the FODMAPS content depleted sufficiently for use in a low-FODMAPS WGPF.

It is further preferred that by a process of the present invention proportions of materials including WGP that are insoluble in water are combined with a proportion of one or more materials that are soluble in water but depleted of FODMAPS including a Wheat Albumin Concentrate with FODMAPS content reduced sufficiently for use in a low-FODMAPS WGPF constituted by proportions of soluble wheat protein, wheat dextrin and soluble wheat fibre to produce a reconstituted low-FODMAPS WGPF product containing WGP and a proportion of constituents of flour from wheat or other source with FODMAPS content depleted sufficiently for use in a low-FODMAPS WGPF as afore defined. Said Wheat Albumin Concentrate should contain soluble wheat protein in a range of about 40-90% on a N %×6.25 dry solids basis.

It is further preferred that by a process of the present invention WGP as dried vital wheat gluten and other preferred and selected materials having FODMAPS content sufficiently low for use in a low-FODMAPS WGPF that have been dried, milled and sieved are combined with thorough mixing in the dry state to produce a reconstituted low-FODMAPS WGPF product as afore defined containing proportions of the constituents with FODMAPS content depleted sufficiently for use in a low-FODMAPS WGPF.

It is further preferred that by a process of the present invention WGP as freshly recovered and washed wet gluten with FODMAPS content depleted sufficiently for use in a low-FODMAPS WGPF and other preferred and selected materials with FODMAPS content sufficiently low for use in a low-FODMAPS WGPF that have been recovered but not dried are combined in the wet state and then dried, milled and sieved to produce a reconstituted low-FODMAPS WGPF product as afore defined containing proportions of the constituents with FODMAPS content depleted sufficiently for use in low-FODMAPS.

It is further preferred that by a process of the present invention reconstituted low-FODMAPS WGPF products as afore defined are produced containing proportions of WGP with FODMAPS content sufficiently low for use in a low-FODMAPS WGPF and other preferred and selected materials with FODMAPS content sufficiently low for use in a low-FODMAPS WGPF from a wheat flour source or other source which possess and display physical and chemical characteristics due to the WGP content desirable for the preparation of various food types.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with the FODMAPS content depleted sufficiently for use in a low-FODMAPS WGPF together with modified forms of the types of constituents from a wheat flour source or other source also with FOD-MAPS content depleted sufficiently for use in a low-FOD-MAPS WGPF and which possess and display physical and chemical characteristics due to the WGP content desirable for the preparation of various food types.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with FODMAPS content depleted sufficiently for use in a low-FODMAPS WGPF together with modified forms of the types of constituents from a wheat flour or other source also with the FODMAPS content depleted sufficiently for use in a low-FODMAPS WGPF especially forms of WGP chemically modified to enable solubilisation of a portion of the gluten protein, and that such reconstituted low-FODMAPS WGPF products possess and display physical and chemical characteristics due to the WGP content desirable for the preparation of various food types.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with FODMAPS content depleted sufficiently for use in a low-FODMAPS WGPF together with modified forms of the types of constituents from a wheat flour or other source also with the FODMAPS content depleted sufficiently for use in a low-FODMAPS WGPF especially forms of WGP modified by proteolytic enzymes resulting in fragmentation and solubilisation of a major portion of the gluten protein as gluten-derived peptides, and that such low-FODMAPS WGPF products possess and display physical and chemical characteristics due to the WGP content desirable for the preparation of various food types.

It is further preferred that said forms of WGP modified by proteolytic enzymes being thus referred to as wheat protein hydrolysates and being thus constituted predominantly by gluten-derived peptides should contain about 30-90% soluble wheat protein and peptides.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with the FODMAPS content depleted sufficiently for use in a low-FODMAPS WGPF together with modified forms of the types of constituents from a wheat flour source or other source with the FOD-MAPS content depleted sufficiently for use in a low-FOD-MAPS WGPF which possess and display physical and chemical characteristics desirable for the preparation of a range of food types normally and traditionally produced from normal wheat flour.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with the FODMAPS content depleted sufficiently for use in a low-FODMAPS WGPF together with modified forms of the types of constituents from a wheat flour source or other source with FODMAPS content depleted sufficiently for use in a low-FODMAPS WGPF which possess and display physical and chemical characteristics desirable for the preparation of bread and other forms of bakery items normally and traditionally produced from normal wheat flour.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with FODMAPS content depleted sufficiently for use in a low-FODMAPS WGPF together with modified forms of the types of constituents from a wheat flour source or other source with FODMAPS content depleted sufficiently for use in a low-FODMAPS WGPF which possess and display physical and chemical characteristics desirable for the preparation of pastry and biscuit products normally and traditionally produced from normal wheat flour.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with the FODMAPS content depleted sufficiently for use in a low-FODMAPS WGPF together with modified forms of the types of constituents from a wheat flour source or other source with FODMAPS content depleted sufficiently for use in a low-FODMAPS WGPF which possess and display physical and chemical characteristics desirable for the preparation of pasta products normally and traditionally produced from normal wheat flour.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with FODMAPS content depleted sufficiently for use in a low-FODMAPS WGPF together with modified forms of the types of constituents from a wheat flour source or other source with FODMAPS content depleted sufficiently for use in a low-FODMAPS WGPF which possess and display physical and chemical characteristics desirable for the preparation of noodle products normally and traditionally produced from normal wheat flour.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with the FODMAPS content depleted sufficiently for use in a low-FODMAPS WGPF together with modified forms of the types of constituents from a wheat flour source or other source with the FOD-MAPS content depleted sufficiently for use in a low-FOD-MAPS WGPF which possess and display physical and chemical characteristics desirable for the preparation of bread and other forms of bakery items normally and traditionally produced from normal wheat flour but which when consumed do not result in defined symptoms of wheat intolerance.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with the FODMAPS content depleted sufficiently for use in a low-FODMAPS WGPF together with modified forms of the types of constituents from a wheat flour source or other source with the FODMAPS content depleted sufficiently for use in a low-FODMAPS WGPF which possess and display physical and chemical characteristics desirable for the preparation of pastry and biscuit products such as normally and traditionally produced from normal wheat flour but which when consumed do not result in defined symptoms of wheat intolerance.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with the FODMAPS content depleted sufficiently for use in a low-FODMAPS WGPF together with modified forms of the types of constituents from a wheat flour source or other source with the FODMAPS content depleted sufficiently for use in a low-FODMAPS WGPF which possess and display physical and chemical characteristics desirable for the preparation of pasta products such as normally and traditionally produced from normal wheat flour but which when consumed do not result in defined symptoms of wheat intolerance.

It is further preferred that by a process of the present invention reconstituted low-FODMAPS WGPF products as afore defined are produced containing proportions of WGP having FODMAPS content sufficiently low for use in a low-FODMAPS WGPF and other constituents of a source wheat flour or other source with the FODMAPS content depleted sufficiently for use in a low-FODMAPS WGPF together with modified forms of the types of constituents from a wheat flour source or other source with the FODMAPS content depleted sufficiently for use in a low-FODMAPS WGPF which possess and display physical and chemical characteristics desirable for the preparation of noodle products such as normally and traditionally produced from normal wheat flour but which when consumed do not result in defined symptoms of wheat intolerance.

It is further preferred that by a process of the present invention food materials and reconstituted low-FODMAPS WGPF products as afore defined are produced with low and depleted levels of FODMAPS as determined by an accepted and published chemical test procedure.

It is further preferred that by a process of the present invention food materials and reconstituted low-FODMAPS WGPF products as afore defined are produced with low and depleted levels of FODMAPS determined to be suitable for persons displaying wheat intolerance by an established in vivo method relying upon the analysis of exhaled breath gases following consumption of said food materials or reconstituted low-FODMAPS WGPF products.

Utilising a reconstituted low-FODMAPS WGPF product as afore defined of the present invention that has FODMAPS content sufficiently low to meet medically established criteria for low-FODMAPS content in foods as an ingredient in a food formulation, a low-FODMAPS food product is prepared. The food product may be of any type normally prepared with a normal wheat flour as the major ingredient and with minor ingredients that also have FODMAPS content sufficiently low to meet medically established criteria for low-FODMAPS content in foods such that the final combined food product is also a low-FODMAPS food.

Utilising a reconstituted low-FODMAPS WGPF product as afore defined of the present invention that has FODMAPS content sufficiently low to meet medically established criteria for low-FODMAPS content in foods as the major ingredient in a food formulation, a low-FODMAPS food product of a bakery-type is prepared such products including leavened and unleavened breads of various compositions.

Utilising a reconstituted low-FODMAPS WGPF product as afore defined of the present invention that has FODMAPS content sufficiently low to meet medically established criteria for low-FODMAPS content in foods as the major ingredient in a food formulation, a low-FODMAPS food product of a bakery-type is prepared such products including scones and muffins of various compositions.

Utilising a reconstituted low-FODMAPS WGPF product as afore defined of the present invention that has FODMAPS content sufficiently low to meet medically established criteria for low-FODMAPS content in foods as the major ingredient in a food formulation and including as minor ingredients food materials having FODMAPS content sufficiently low to meet medically established criteria for low-FODMAPS content in foods, a low-FODMAPS food product of a doughnut-type is prepared.

Utilising a reconstituted low-FODMAPS WGPF product as afore defined of the present invention that has FODMAPS content sufficiently low to meet medically established criteria for low-FODMAPS content in foods as the major ingredient in a food formulation and including as minor ingredients food materials having FODMAPS content sufficiently low to meet medically established criteria for low-FODMAPS content in foods, a low-FODMAPS food product of a pastry-type is prepared.

Utilising a reconstituted low-FODMAPS WGPF product as afore defined of the present invention that has FODMAPS content sufficiently low to meet medically established criteria for low-FODMAPS content in foods as the major ingredient in a food formulation and including as minor ingredients food materials having FODMAPS content sufficiently low to meet medically established criteria for low-FODMAPS content in foods, a low-FODMAPS food product of a biscuit-type is prepared Utilising a reconstituted low-FODMAPS WGPF product as afore defined of the present invention that has FODMAPS content sufficiently low to meet medically established criteria for low-FODMAPS content in foods as the major ingredient in a food formulation and including as minor ingredients food materials having FODMAPS content sufficiently low to meet medically established criteria for low-FODMAPS content in foods, a low-FODMAPS food product of a pasta-type is prepared Utilising a reconstituted low-FODMAPS WGPF product as afore defined of the present invention that has FODMAPS content sufficiently low to meet medically established criteria for low-FODMAPS content in foods as the major ingredient in a food formulation and including as minor ingredients food materials having FODMAPS content sufficiently low to meet medically established criteria for low-FODMAPS content in foods, a low-FODMAPS food product of a noodle-type is prepared Utilising a reconstituted low-FODMAPS WGPF product as afore defined of the present invention that has FODMAPS content sufficiently low to meet medically established criteria for low-FODMAPS content in foods as the major ingredient in a food formulation and including as minor ingredients food materials having FODMAPS content sufficiently low to meet medically established criteria for low-FODMAPS content in foods, a low-FODMAPS extruded food product is prepared suitable for consumption as a breakfast cereal-type product or a snack-food-type product.

DETAILED DESCRIPTION OF NON-LIMITING EXAMPLES OF THE INVENTION

Example 1. Preparation of Reconstituted Low-FODMAPS WGPF Products as Afore Defined Suitable for Low-FODMAPS Bread and Other Food Types that Depend on the Unique Visco-Elastic Properties of Wheat Gluten Protein Bread making requires a strong flour with wheat gluten (WGP) content typically greater than 10%.
- (i) To 800 g of commercial A-grade food-grade wheat starch that had been extensively washed with water prior to drying and shown by analysis to have FODMAPS content sufficiently low for use in a low-FODMAPS WGPF was added 120 g of Vital Wheat Gluten (VWG) containing 80% protein on a N×6.25 and dry solids basis. The VWG was commercial
- (ii) food-grade gluten that had been extensively washed with water prior to drying and shown by analysis to have FODMAPS content sufficiently low for use in a low-FODMAPS WGPF. The ingredients were well-blended as a dry mix and formed the basic reconstituted low-FODMAPS WGPF product as afore defined.
- (iii) To 830 g of commercial A-grade food-grade wheat starch as in Example 1(i) was added 120 g VWG as used in Example 1(i) and 50 g of Wheat Albumin Concentrate (WAC) containing 40% soluble wheat protein obtained after recovery using ultrafiltration technology from the aqueous washings from starch and gluten manufacture. During preparation the liquid protein concentrate being retained by the ultrafiltration membrane was extensively diafiltered with water to greatly reduce the content of all low molecular weight substances and so after drying resulted in a WAC shown by analysis to have FODMAPS content sufficiently low for use in a low-FODMAPS WGPF. The dry ingredients were well blended as in Example 1(i) and resulted in a more-complex reconstituted low-FODMAPS WGPF product as afore defined.
- (iv) To 780 g of commercial A-grade food-grade wheat starch as in Example 1(i) was added 120 g VWG as used in Example 1(i), 50 g of Wheat Albumin Concentrate (WAC) as in Example 1(ii) and 50 g of extensively washed wheat fibre recovered from the starch-gluten manufacturing process as a by-product, subsequently then dried and milled and shown by analysis to be a wheat fibre food-grade ingredient having FODMAPS content sufficiently low for use in a low-FODMAPS WGPF. The dry ingredients were well blended as in Example 1(i) and resulted in an even-more-complex reconstituted low-FODMAPS WGPF product as afore defined.
- (v) To 830 g of commercial A-grade food-grade wheat starch as in Example 1(i) was added 120 g VWG as used in Example 1(i) and 50 g of enzyme-
- (vi) hydrolysed wheat gluten shown by analysis to have FODMAPS content sufficiently low for use in a low-FODMAPS WGPF containing at least 67% of soluble peptides. The dry ingredients were well blended as in Example 1(i) and resulted in a more-functional reconstituted low-FODMAPS WGPF product as afore defined.
- (vii) To 830 g of commercial A-grade food-grade wheat starch as in Example 1(i) was added 120 g VWG as used in Example 1(i) and 50 g of enzyme-hydrolysed wheat gluten shown by analysis to have FODMAPS content sufficiently low for use in a low-FODMAPS WGPF containing at least 90% of soluble peptides. The dry ingredients were well blended as in Example 1(i) and resulted in a more-functional reconstituted low-FODMAPS WGPF product as afore defined.
- (viii) To 830 g of commercial A-grade food-grade wheat starch as in Example 1(i) was added 120 g VWG as used in Example 1(i) and 50 g of enzyme-hydrolysed wheat gluten containing at least 67% of soluble peptides as used in Example 1(iv). The dry ingredients were well blended as in Example 1(i) and to which was added 1 g sunflower oil so resulting in a more-functional reconstituted low-FODMAPS WGPF product as afore defined.
- (ix) To 830 g of commercial A-grade food-grade wheat starch as in Example 1(i) was added 120 g VWG as used in Example 1(i) and 50 g of enzyme-hydrolysed wheat gluten containing at least 67% of soluble peptides as used in Example 1(iv). The dry ingredients were well blended as in Example 1(i) and to which was added 1 g sunflower oil and 0.2 g lecithin so resulting in a more-functional reconstituted low-FODMAPS WGPF product as afore defined.
- (x) 415 g of commercial A-grade food-grade wheat starch as used in Example 1(i) was mixed with 415 g of corn (maize) starch. To this was added 120 g VWG as used in Example 1(i) and 50 g of enzyme-hydrolysed wheat gluten containing at least 67% of soluble peptides as used in Example 1(iv). The dry ingredients were well blended as in Example 1(i) resulting in a more-functional reconstituted low-FODMAPS WGPF product as afore defined.

Analysis of reconstituted low-FODMAPS WGPF products for FODMAPS content.

FODMAPS (Total Fructan) content of reconstituted low-FODMAPS WGPF products was estimated using the method of Biesiekierski et al. (2011). (J. R. Biesiekierski, O. Rosella, R. Rose, K. Leis, J. S. Barrett, S. J. Shepherd, P. R. Gibson and J. G. Muir (2011) Quantification of fructans, galacto-oligosaccharides and other short-chain carbohydrates in processed grains and cereals. *J Hum Nutr Diet* 24:154-176)

To be considered a low-FODMAPS food item, a standard serve according to ????????Biesiekierski et al (2011) should contain less than 30 mg FODMAPS.

Accurately about 1 g of reconstituted low-FODMAPS WGPF product was dispersed in 100 mL of hot deionised water (80 C) and stirred while maintaining the temperature for 15 minutes. Each sample was filtered through Whatman No 1 filter paper and then a small portion was microfiltered through a 0.22 micron syringe filter.

Normal all-purpose wheat flour and rice flour were also analysed in the same manner as flours that are respectively not tolerated and tolerated by IBS; NCGS patients.

Total Fructan content was determined by the commercially available enzymatic kit (Megazyme Fructan HK Assay Kit, Megazyme International Ireland ltd, Wicklow Ireland; AOAC Method 999.03 and AACC Method 32.32) as directed by the manufacturer.

FODMAPS content of reconstituted low-FODMAPS WGPF products and flours is shown in Table 1.

TABLE 1

| Reconstituted low-FODMAPS WGPF samples and flours | Total Fructan content (mg FODMAPS, 100 g low-FODMAPS WGPF or flour) |
|---|---|
| (i) | 450 |
| (ii) | 480 |
| (iii) | 480 |
| (iv) | 490 |
| (v) | 450 |
| (vi) | 450 |
| (vii) | 450 |
| (viii) | 480 |
| All-purpose flour | 2350 |
| Rice flour | 550 |

Example 2 Preparation of Low-FODMAPS Wheat Bread

For initial trials to develop formulations and identify the importance of flour components in bread made from reconstituted low-FODMAPS WGPF products, an automated bread-making machine was used in a Rapid-bake mode resulting in bread being made in 2 hours from start of the baking process.

(i) Bread Preparation Using Regular "Strong" Wheat Flour Suitable for Bread Making Into the bread-maker chamber were added 400 g bakers flour, 8 g salt, 12 g compressed yeast, 4 g of soft improver, 2 g shortening and 244 g of water. The bread-maker bake cycle was started and after 2 hours the baked bread was removed and allowed to cool prior to evaluation of loaf volume, crust colour and crumb texture.

| Results | |
|---|---|
| Loaf volume | 2800 mL |
| Crust colour | golden brown |
| Crumb texture | open and light |

(ii) Bread Preparation Using Reconstituted Low-FODMAPS WGPF Product as in Example 1(i)

Into the bread-maker chamber were added 400 g reconstituted low-FODMAPS WGPF as in Example 1(i) together with other non-flour ingredients as in Example 2(i) and baked and evaluated as in Example 2(i)

| Results | |
|---|---|
| Loaf volume | 1500 mL |
| Crust colour | pale brown |
| Crumb texture | tightly closed and heavy |

(iii) Bread Preparation Using Reconstituted Low-FODMAPS WGPF Product as in Example 1(ii)

Into the bread-maker chamber were added 400 g reconstituted low-FODMAPS WGPF as in Example 1(ii) together with other non-flour ingredients as in Example 2(i) and baked and evaluated as in Example 2(i)

| Results | |
|---|---|
| Loaf volume | 2400 mL |
| Crust colour | light brown |
| Crumb texture | open and quite light |

(iv) Bread Preparation Using Reconstituted Low-FODMAPS WGPF Product as in Example 1(iii)

Into the bread-maker chamber were added 400 g reconstituted low-FODMAPS WGPF as in Example 1(iii) together with other non-flour ingredients as in Example 2(i) and baked and evaluated as in Example 2(i)

| Results | |
|---|---|
| Loaf volume | 2300 mL |
| Crust colour | light brown |
| Crumb texture | open and quite light |

(v) Bread Preparation Using Reconstituted Low-FODMAPS WGPF Product as in Example 1(iv)

Into the bread-maker chamber were added 400 g reconstituted low-FODMAPS WGPF as in Example 1(iv) together with other non-flour ingredients as in Example 2(i) and baked and evaluated as in Example 2(i)

| Results | |
|---|---|
| Loaf volume | 2400 mL |
| Crust colour | light brown |
| Crumb texture | open and quite light |

(vi) Bread Preparation Using Reconstituted Low-FODMAPS WGPF Product as in Example 1(v)

Into the bread-maker chamber were added 400 g reconstituted low-FODMAPS WGPF as in Example 1(v) together with other non-flour ingredients as in Example 2(i) and baked and evaluated as in Example 2(i)

| Results | |
|---|---|
| Loaf volume | 2500 mL |
| Crust colour | light brown |
| Crumb texture | open and quite light |

Analysis of Breads for Total Fructan Content

Total Fructan content of bread was essentially by the method in Example 1. A portion of bread from inside of the crust, and not including any of the crust, was crumbed in a kitchen coffee grinder to a fine crumb consistency. The dry solids content of this was determined using standard oven drying and gravimetric analysis method. Accurately about 1 g of crumbed bread was used for Total Fructan analysis.

FODMAPS content of bread samples is shown in Table 2.

TABLE 2

| Bread sample | Total fructan content (mg FODMAPS/100 g dried bread) |
|---|---|
| Example 2(i) | 2180 |
| Example 2(ii) | 420 |
| Example 2(iii) | 420 |
| Example 2(iv) | 430 |
| Example 2(v) | 400 |
| Example 2(vi) | 400 |

Example 3 Preparation of Low-FODMAPS Doughnuts

Non-flour ingredients for doughnuts were selected to be free of or contain only low levels of FODMAPS

| Ingredients | |
|---|---|
| 1000 g or | all purpose wheat flour (control) |
| 1000 g | reconstituted low-FODMAPS WGPF as in Example1(v) |
| 50 g | sugar |
| 10 g | salt |
| 500 g | lukewarm water |
| 20 g | active dry yeast |
| 10 g | soft bread improver |
| 80 g | canola oil |

Method

All ingredients were mixed in a dough processor until the dough temperature reached 26 C. After resting for 15 minutes, the dough was rolled out into a sheet approximately 2 cm thick. Ring doughnut shapes were cut from the dough sheet and proofed for 30 minutes. The puffed dough rings were then deep fried at 190 C then drained and cooled.

Total Fructan Content of Doughnuts

Doughnuts were made to commercially acceptable quality based on appearance, texture and flavour. A cross-section portion of doughnut was crumbed when cold as in Example 2 and Total Fructan content estimated as in Example 2. FODMAP content of doughnut made with preferred reconstituted low-FODMAPS WGPF is compared to that of doughnut made from normal all-purpose wheat flour in Table 3.

TABLE 3

| Flour type in doughnut formulation | (mg FODMAPS/100 g dried doughnut) |
|---|---|
| All-purpose wheat flour | 1960 |
| Reconstituted low-FODMAPS WGPF, Example 1(v) | 380 |

Example 4 Preparation of Low-FODMAPS Croissants

Non-flour ingredients for croissants were selected to be free of or contain only low levels of FODMAPS. The recipe and method were adapted from a public home cookery source.

| Ingredients | |
|---|---|
| 375 g or | all-purpose wheat flour (control) |
| 375 g | reconstituted low-FODMAPS WGPF as in Example1(v) |
| 230 g | sugar |
| 3 g | salt |
| 250 g | lukewarm water |
| 10 g | active dry yeast |
| 225 g | cold unsalted butter |

Method

Working in a room cool enough for the butter not to melt, yeast was mixed into warm water and allowed to stand until foamy. The flour (all-purpose wheat flour or reconstituted low-FODMAPS WGPF) was mixed with sugar and salt. The yeast mixture was added and mixed. The mixture was kneaded until it was not sticky. The dough was wrapped and chilled for 15 min. The butter was sliced into thin slices. The dough was unwrapped and rolled out into a square. Slices of butter were laid on the centre of the dough square. The dough was folded over and sealed. The folded dough was rolled out and folded again, and then again. The roll and fold steps were repeated twice more. The dough was allowed to rest between each roll and fold. Finally, the dough was rolled into a rectangle and cut into triangles. Each triangle was stretched and rolled up. The rolled triangles of dough were allowed to rise for about 2 hours until puffy and baked in a hot oven, 245 C, until golden brown approximately 20 minutes.

Total Fructan Content of Croissants

Croissants were made to commercially acceptable quality based on appearance, texture and flavour. A cross-section portion of croissant was crumbed when cold as in Example 2 and Total Fructan content estimated as in Example 2. FODMAP content of croissant made with preferred reconstituted low-FODMAPS WGPF is compared to that of croissant made from normal all-purpose wheat flour in Table 4.

TABLE 4

| Flour type in croissant formulation | (mg FODMAPS/100 g dried croissant) |
|---|---|
| All-purpose wheat flour | 850 |
| Reconstituted low-FODMAPS WGPF, Example 1(v) | 160 |

Example 5 Preparation of Reduced-FODMAPS Muffins

Non-flour ingredients for muffins were selected to be free of or contain only low levels of FODMAPS. The recipe and method were adapted from a public home cookery source. The flour contained starches from both wheat and corn (maize) to improve the texture.

| Ingredients | |
|---|---|
| 800 g or | all-purpose wheat flour (control) |
| 800 g | reconstituted low-FODMAPS WGPF as in Example1(viii) |
| 580 g | caster sugar |
| 15 g | salt |
| 20 g | baking powder |
| 140 g | egg |
| 20 g | Pre-Gel wheat starch. |
| 140 g | canola oil |
| 400 g | water |
| 1 g | vanilla essence |

Method

All dry ingredients were blended thoroughly. All liquids and oil were added and mixed until smooth for 2 minutes. Portions of batter were filled into paper muffin cases and baked at 190 C for approximately 15 minutes or until golden brown.

Total Fructan Content of Muffins

Muffins were made to commercially acceptable quality based on appearance, texture and flavour. A cross-section portion of muffin was crumbed when cold as in Example 2 and Total Fructan content estimated as in Example 2. FODMAP content of muffin made with preferred reconstituted low-FODMAPS WGPF is compared to that of muffin made from normal all-purpose wheat flour in Table 5.

TABLE 5

| Flour type in muffin formulation | (mg FODMAPS/100 g dried muffin) |
|---|---|
| All-purpose wheat flour | 1180 |
| Reconstituted low-FODMAPS WGPF, Example 1(viii) | 240 |

Example 6. Preparation of Low-FODMAPS Scones

Non-flour ingredients for scones were selected to be free of or contain only low levels of FODMAPS.

| | Ingredients |
|---|---|
| 2000 g or | all-purpose wheat flour (control) |
| 2000 g | reconstituted low-FODMAPS WGPF as in Example 1(v) |
| 380 g | caster sugar |
| 6 g | salt |
| 140 g | baking powder |
| 55 g | milk protein concentrate 85. |
| 290 g | cake fat |
| 1400 g | water |

Method

All the dry ingredients were mixed thoroughly and sieved. The fat was rubbed through the dry ingredients mix. The water was added slowly and mixed to a smooth thick paste. Portions were cut out onto scone trays and baked at 220 C for approximately 20 minutes or until a light golden brown colour.

Total Fructan Content of Scones

Scones were made to commercially acceptable quality based on appearance, texture and flavour. A cross-section portion of scone was crumbed when cold as in Example 2 and Total Fructan content estimated as in Example 2. FODMAP content of scone made with preferred reconstituted low-FODMAPS WGPF is compared to that of scone made from normal all-purpose wheat flour in Table 6.

TABLE 6

| Flour type in scone formulation | (mg FODMAPS/100 g dried scone) |
|---|---|
| All-purpose wheat flour | 1560 |
| Reconstituted low-FODMAPS WGPF, Example 1(v) | 300 |

Example 7 Preparation of Low-FODMAPS Tortilla

Non-flour ingredients for tortillas were selected to be free of or contain only low levels of FODMAPS.

| | Ingredients |
|---|---|
| 250 g or | all-purpose wheat flour (control) |
| 250 g | reconstituted low-FODMAPS WGPF as in Example1(v) |
| 20 g | shortening |
| 3.75 g | salt |
| 95 g | water |
| 1 g | baking powder |
| 1.25 g | Improver |

Method

The flour, baking powder, improver and salt were combined and the shortening and water added while stirring continuously. The dough was kneaded gently, rested for 10 minutes then divided into 50 g pieces and rolled out to 1 mm thick. Tortillas were cooked in a hot pan for 30 seconds on each side until patches of golden brown appeared.

Total Fructan Content of Tortilla

Tortillas were made to commercially acceptable quality based on appearance, texture and flavour. A central portion of tortilla was crumbed when cold as in Example 2 and Total Fructan content estimated as in Example 2. FODMAP content of tortilla made with preferred reconstituted low-FODMAPS WGPF is compared to that of tortilla made from normal all-purpose wheat flour in Table 7.

TABLE 7

| Flour type in tortilla formulation | (mg FODMAPS/100 g dried tortilla) |
|---|---|
| All-purpose wheat flour | 1940 |
| Reconstituted low-FODMAPS WGPF, Example 1(v) | 370 |

Example 8 Preparation of Low-FODMAPS Biscuit

Non-flour ingredients for biscuits were selected to be free of or contain only low levels of FODMAPS.

| | Ingredients |
|---|---|
| 1000 g or | all-purpose wheat flour (control) |
| 1000 g | reconstituted low-FODMAPS WGPF as in Example1(v) |
| 100 g | egg |
| 700 g | unsalted butter |
| 340 g | caster sugar |
| 8 g | salt |

Method

The butter and sugar were beaten until pale and creamy. Gradually the eggs were added while mixing and then the wheat flour or low-FODMAPS WGPF and salt were added and mixed for 2 minutes. Approximately 40 g portions of mix were placed onto flat baking trays and baked at 180 C for 12 minutes or until light golden brown colour.

Total Fructan Content of Biscuits

Biscuits were made to commercially acceptable quality based on appearance, texture and flavour. A portion of biscuit was crumbed when cold as in Example 2 and Total Fructan content estimated as in Example 2. FODMAP content of biscuit made with preferred reconstituted low-FODMAPS WGPF is compared to that of biscuit made from normal all-purpose wheat flour in Table 8.

TABLE 8

| Flour type in biscuit formulation | (mg FODMAPS/100 g dried biscuit) |
|---|---|
| All-purpose wheat flour | 1020 |
| Reconstituted low-FODMAPS WGPF, Example 1(v) | 190 |

Example 9 Preparation of Low-FODMAPS Shortcrust Pastry Cases

Non-flour ingredients for shortcrust pastry were selected to be free of or contain only low levels of FODMAPS. The recipe and method were adapted from a public home cookery source.

| Ingredients | |
|---|---|
| 250 g | all-purpose wheat flour (control) |
| or | |
| 250 g | reconstituted low-FODMAPS WGPF as in Example1(v) |
| 125 g | unsalted butter |
| 60 g | egg |
| 0.5 g | salt |

Method

The flour or low-FODMAPS WGPF, butter and salt were processed in a food processor until crumbed. Beaten egg was added to the mix with the processor running and processed until large clumps formed. The dough was formed into a ball and kneaded gently to combine. It was then wrapped and refrigerated for 2 hours. The dough was rolled out and cut into the desired size and baked blind in preferred baking pans at 180 C until golden brown.

Total Fructan Content of Shortcrust Pastry

Shortcrust pastry cases were made to commercially acceptable quality based on appearance, texture and flavour. A portion of shortcrust pastry case was crumbed when cold as in Example 2 and Total Fructan content estimated as in Example 2. FODMAP content of shortcrust pastry case made with preferred reconstituted low-FODMAPS WGPF is compared to that of shortcrust pastry case made from normal all-purpose wheat flour in Table 9.

TABLE 9

| Flour type in pastry formulation | (mg FODMAPS/100 g dried shortcrust pastry) |
|---|---|
| All-purpose wheat flour | 1430 |
| Reconstituted low-FODMAPS WGPF, Example 1(v) | 270 |

Example 10 Preparation of Low-FODMAPS White Noodles

| Ingredients | |
|---|---|
| 2000 g | all-purpose wheat flour (control) |
| or | |
| 2000 g | reconstituted low-FODMAPS WGPF, Example 1(vi) |
| 40 g | salt |
| 750 g | water |

Method

The selected flour type was placed in a food processor. The salt was dissolved in the water and trickled in while mixing the flour in the food processor and mixed until a crumb was formed. The loose crumbs were compressed and formed into a rectangular block then rolled through a roller press at its widest setting. The resulting dough sheet was folded in half and the step repeated six times then rested for 30 minutes. Rolling the dough was continued with progressively thinner spacing down to the required noodle thickness. The sheet was cut into strands with the cutting rollers and cooked immediately in boiling water for 20 minutes, drained and cooled.

Total Fructan Content of White Noodles

White noodles were made to commercially acceptable quality based on appearance, texture and flavour. A portion of white noodles was crumbed when cold as in Example 2 and Total Fructan content estimated as in Example 2. FODMAP content of white noodles made with preferred reconstituted low-FODMAPS WGPF is compared to that of white noodles made from normal all-purpose wheat flour in Table 10.

TABLE 10

| Flour type in white noodles | (mg FODMAPS/100 g dried white noodles) |
|---|---|
| All-purpose wheat flour | 2300 |
| Reconstituted low-FODMAPS WGPF, Example 1(vi) | 440 |

Example 11 Preparation of Low-FODMAPS Yellow Alkaline Noodles

| Ingredients | |
|---|---|
| 2000 g | all-purpose wheat flour (control) |
| or | |
| 2000 g | reconstituted low-FODMAPS WGPF, Example 1(vii) |
| 20 g | sodium carbonate |
| 750 g | water |

Method

The selected flour type was placed in a food processor. The salt was dissolved in the water trickled in while mixing the flour in the food processor and mixed until a crumb was formed. The loose crumbs were compressed, formed into a rectangular block and rolled through a roller press at its widest setting. The resulting dough sheet was folded in half and this step repeated six times. The dough was rested for 30 minutes. Rolling the dough continued with progressively thinner spacing down to the required noodle thickness. The sheet was cut into strands with the cutting rollers and cooked immediately in boiling water for 20 minutes, drained and cooled.

Total Fructan Content of Yellow Alkaline Noodles

Yellow alkaline noodles were made to commercially acceptable quality based on appearance, texture and flavour. A portion of yellow alkaline noodles was crumbed when cold as in Example 2 and Total Fructan content estimated as in Example 2. FODMAP content of yellow alkaline noodles made with preferred reconstituted low-FODMAPS WGPF is compared to that of yellow alkaline noodles made from normal all-purpose wheat flour in Table 11.

TABLE 11

| Flour type in yellow noodles | (mg FODMAPS/100 g dried yellow noodles |
|---|---|
| All-purpose wheat flour | 2300 |
| Reconstituted low-FODMAPS WGPF, Example 1(vii) | 440 |

Example 12 Preparation of Low-FODMAPS Dried Instant Noodles

| | Ingredients |
|---|---|
| 2000 g or | all-purpose wheat flour (control) |
| 2000 g | reconstituted low-FODMAPS WGPF, Example 1(vii) |
| 40 g | salt |
| 4 g | sodium carbonate |
| 750 g | water |

Method

The selected flour type was placed in a food processor. The salt was dissolved in the water and trickled in while mixing the flour in the food processor and mixed until a crumb was formed. The loose crumbs were compressed and formed into a rectangular block then rolled through a roller press at its widest setting. The resulting dough sheet was folded in half and the step repeated six times then rested for 30 minutes. Rolling the dough was continued with progressively thinner spacing down to the required noodle thickness. The sheet was cut into strands with the cutting rollers and cooked in a steamer for 20 minutes. The cooked strands were then deep flied briefly to dehydrate and then drained and cooled.

Fructan Content of Dried Instant Noodles

Dried instant noodles were made to commercially acceptable quality based on appearance, texture and flavour. A portion of instant noodles was crumbed as in Example 2 and Total Fructan content estimated as in Example 2. FODMAP content of dried instant noodles made with preferred reconstituted low-FODMAPS WGPF is compared to that of dried instant noodles made from normal all-purpose wheat flour in Table 12.

TABLE 12

| Flour type in instant noodles | (mg FODMAPS/100 g dried instant noodles) |
|---|---|
| All-purpose wheat flour | 2300 |
| Reconstituted low-FODMAPS WGPF, Example 1(vii) | 430 |

Example 13 Preparation of Low-FODMAPS Pasta

| | Ingredients |
|---|---|
| 2000 g or | all-purpose wheat flour (control) |
| 2000 g | reconstituted low-FODMAPS WGPF, Example 1(vii) |
| 40 g | salt |
| 750 g | water |

Method

Each of the selected flour types were placed in a food processor. The salt was dissolved in the water and trickled in while mixing the flour in the food processor and mixed until a crumb was formed. The loose crumbs were compressed and formed into a rectangular block then rolled through a roller press at its widest setting. The resulting dough sheet was folded in half and the step repeated six times then rested for 30 minutes. Rolling the dough was continued with progressively thinner spacing down to the required pasta thickness. The sheet was cut into strands with the cutting rollers and refrigerated or dried for preservation.

Total Fructan Content of Pasta

Pasta was made to commercially acceptable quality based on appearance, texture and flavour. A portion of pasta was crumbed when cold as in Example 2 and Total Fructan content estimated as in Example 2. FODMAP content of pasta made with preferred reconstituted low-FODMAPS WGPF is compared to that of pasta made from normal all-purpose wheat flour in Table 13.

TABLE 13

| Flour type in pasta | (mg FODMAPS/100 g dried pasta) |
|---|---|
| All-purpose wheat flour | 2300 |
| Reconstituted low-FODMAPS WGPF, Example 1(vii) | 440 |

Example 14 Preparation of a Low-FODMAPS Extruded Expanded Breakfast Cereal Product Ingredients for low-FODMAPS extruded expanded breakfast cereal were selected to be free of or contain only low levels of FODMAPS.

| Ingredients |
|---|
| 32 kg all-purpose wheat flour (control) or |
| 32 kg reconstituted low-FODMAPS WGPF, Example 1(i) |
| 10 kg washed wheat fibre as used in Example 1(iii) |
| 10 kg maize flour |
| 20 kg rice flour |
| 18 kg wheat protein hydrolysate (82% protein) as used in Example 1(iv) |
| 9 kg sugar |
| 1 kg salt |

Method

All dry ingredients were thoroughly mixed in a ribbon blender. The ingredient mix was introduced into the barrel together with enough water to achieve the desired extruded product. Product was extruded through a Clextral twin screw extruder with barrel diameter of 33 mm and length of 768 mm in 6 consecutive heating zones. Product was extruded through a die having 2 mm diameter and 5 mm length.

Total Fructan Content of Extruded Expanded Breakfast Cereal

Extruded expanded breakfast cereal product was made to commercially acceptable quality based on appearance, texture and flavour. A portion of extruded breakfast cereal was crumbed when cold as in Example 2 and Total Fructan content estimated as in Example 2. FODMAP content of extruded breakfast cereal made with preferred reconstituted low-FODMAPS WGPF is compared to that of extruded breakfast cereal made from normal all-purpose wheat flour in Table 14.

TABLE 14

| Flour type in extruded cereal | (mg FODMAPS/100 g dried extruded cereal) |
|---|---|
| All-purpose wheat flour | 770 |
| Reconstituted low-FODMAPS WGPF, Example 1(i) | 160 |

It will thus be appreciated that this invention at least in the forms of the examples described provides novel and improved food products for wheat intolerant persons as well as methods and processes for producing such products. The examples disclosed herein are however only the currently preferred forms of the invention and additional modifications may be made within the scope of said invention as defined by the following claims.

PRIOR ART US PATENTS CITED

U.S. Pat. No. 4,255,518
U.S. Pat. No. 4,412,867
U.S. Pat. No. 8,372,466

PRIOR ART US PATENT APPLICATIONS CITED 20050129823
20060008568
2009252844
20120196013

OTHER PRIOR ART PUBLICATIONS CITED

Barrett, J. S, Gearry, R. B, Muir, J G, Irving, P. M, Rose, R, Rosella, O, Haines, M. L, Shepherd, S. J, and Gibson, P. R. (2010) *Aliment Pharmacol Ther* 31:874-882 Dietary poorly absorbed, short-chain carbohydrates increase delivery of water and fermentable substrates to the proximal colon. http://www.gastrojournal.org/article/S0016-5085(13)00702-6/abstract-article-footnote-1#article-footnote-1 http://www.gastrojournal.org/article/S0016-5085(13)00702-6/abstract-article-footnote-2#article-footnote-2

Biesiekierski, J. R., Newnham, E. D., Irving, P. M., Barrett, J. S., Haines, M., Doecke, J. D., Shepherd, S. J., Muir, J. G. and Gibson, P. R. (2011) *Am. J. Gastroenterol* 106, 508-514. Gluten causes gastrointestinal symptoms in subjects without celiac disease: a double blind randomised placebo-controlled trial Biesiekierski, J. R., O. Rosella, R. Rose, K. Leis, J. S. Barrett, S. J. Shepherd, P. R. Gibson and J. G. Muir (2011) *J Hum Nutr Diet* 24:154-176 Quantification of fructans, galacto-oligosaccharides and other short-chain carbohydrates in processed grains and cereals.

Biesiekierski, J. R, Peters, S. L., Newnham, E. D., Rosella, O, Muir, J. G. and Gibson P. R. (2013) *Gastroenterology* 145(2) 320-328 No Effects of Gluten in Patients With Self-Reported Non-Coeliac Gluten Sensitivity After Dietary Reduction of Fermentable, Poorly Absorbed, Short-Chain Carbohydrates Carlo Catassi et al www.ncbi.nlm.nih.gov/pmc/articles/PMC3820047, Non Coeliac Gluten Sensitivity: The New Frontier of Gluten Related Disorders R. R. Gibson & S. J. Shepherd (2005) *Aliment. Pharmacol. Ther.* 21, 1399-1409. Personal view: food for thought—western lifestyle and susceptibility to Crohn's disease. The FODMAPS hypothesis Gibson, P. R and Shepherd, S. J. (2010) *J Gastroenterol Hepatol.* 25: 252-258 Evidence-based dietary management of functional gastrointestinal symptoms: the FODMAPS approach.

Halmos, Emma P., Victoria A. Power, Susan J. Shepherd, Peter R. Gibson and Jane G. Muir (2014) *Gastroenterol* 146: 67-75. A diet low in FODMAPS reduces symptoms of Irritable Bowel Syndrome.

Knudsen, K. E. B. (1997) *Animal Feed Sci Technol* 67; 319-338. Carbohydrate and lignin contents of plant materials used in animal feeding.

Lopez, A. C. B, Pereira, A. J. G. and Junqueira R. G. (2004). *Brazilian Arch Biol Technol* 47; 63-70. Flour mixture of Rice Flour, Corn and Cassava starch in the production of gluten-free bread Ong, D. K, Mitchell, S. B, Barrett, J. S, Shepherd, S. J, Irving, P. M, Biesiekierski, J. R, Smith, S, Gibson, P. R. and Muir, J. G. (2010) *L Gastroenerol Hepatol.* 25:1366-1373. Manipulation of dietary short chain carbohydrates alters the pattern of gas production and genesis of symptoms in irritable bowel syndrome.

Shepherd S. J., Parker, F C, Muir J G and Gibson P R *Clin Gastroenterol. Hepatol* 6, 765-711. Dietary triggers of abdominal symptoms in patients with Irritable Bowel Syndrome; randomised placebo-controlled evidence.

Whelan, K, Abrahmsohn, O, David, G J, Staudacher H, Irving, P, Lower M C and Ellis, P R (2011) *Int J Food Sci Nutr* 62(5), 498-503. Fructan content of commonly consumed wheat, rye and gluten-free breads.

The invention claimed is:

1. A reconstituted wheat gluten protein-based flour for use by a wheat intolerant consumer without development of associated defining symptoms of wheat intolerance, said reconstituted wheat gluten protein-based flour comprises:
   a washed Vital Wheat Gluten containing protein on a N %×6.25 dry solids basis in a range of about 80% to 90%;
   a washed starch;
   one or more of: a Wheat Albumin Concentrate containing soluble wheat protein in a range of about 40% to 90% on a N %×6.25 dry solids basis, and a modified wheat protein that contains about 30% to 90% soluble wheat protein and peptides;
   a content target of Fermentable Oligosaccharides, Disaccharides, Monosaccharides And Polyols (FODMAPS) being less than or equal to 1200 mg per 100 mg on a dry solids basis; and
   wherein the washed Vital Wheat Gluten, the washed starch and the one or more of: a Wheat Albumin Concentrate and a modified wheat protein are depleted of FODMAPS.

2. The reconstituted wheat gluten protein-based flour of claim 1 wherein, the composition further comprises fiber materials; and the fiber materials and the washed starch are washed out of wheat gluten protein and depleted of both gluten and FODMAPS.

3. The reconstituted wheat gluten protein-based flour as claimed in claim 1 wherein:
   the content target of FODAMAPS is less than or equal to 600 mg per 100 g on the dry solids basis.

4. A process of producing the reconstituted wheat gluten protein-based flour as claimed in claim 1 including the steps of:
   dispersing a source wheat flour in an aqueous solution at a temperature at which starch particles in said source flour are not hydrated or dissolved;
   recovering the Vital Wheat Gluten from said dispersion;
   washing the Vital Wheat Gluten whereby the FODMAPS content thereof is depleted; and
   combining the FODMAPS depleted Vital Wheat Gluten with the washed starch; and one or more of the Wheat Albumin Concentrate and the modified wheat protein.

5. The process as claimed in claim 4, wherein said temperature is within a range of about 10° C. to about 60° C.

6. The process as claimed in claim 4 wherein insoluble suspended materials of said source wheat flour dispersed in said aqueous solution are recovered by steps of settling, screening, filtration or centrifugation and wherein said one or more insoluble suspended materials are separated into component types.

7. The process as claimed in claim 6 wherein said insoluble suspended materials include one or more of: starches and fibre materials washed out of wheat gluten protein; and wherein said process includes a further step by which said insoluble suspended materials are collected, washed and dried by type before combining with said one or more soluble materials.

8. The process as claimed in claim 7 wherein said one or more soluble materials are recovered by ultrafiltration of a liquor remaining after recovery of said insoluble materials.

9. The process as claimed in claim 8 wherein said ultrafiltration is followed by diafiltration to further deplete FODMAP content of said Wheat Albumin Concentrate.

10. The process as claimed in claim 7 wherein said washed vital wheat gluten and said one or more insoluble suspended materials that have been recovered but not dried are combined in a wet state then dried, milled and sieved.

11. A food product comprising flour, wherein said flour consists of the reconstituted wheat gluten protein-based flour as claimed in claim 1.

12. A food product comprising flour, wherein said flour consists of the reconstituted wheat gluten protein-based flour produced by the process as claimed in claim 4.

\* \* \* \* \*